Sept. 28, 1971  C. E. MILLER  3,608,374
MASS FLOWMETER

Filed March 18, 1969  6 Sheets-Sheet 1

INVENTOR.
CHARLES E. MILLER
BY Charles B. Ungemach
ATTORNEY

Sept. 28, 1971                    C. E. MILLER                    3,608,374
                                 MASS FLOWMETER
Filed March 18, 1969                                          6 Sheets-Sheet 3

INVENTOR.
CHARLES E. MILLER
BY Charles J. Ungemach

ATTORNEY

Sept. 28, 1971  C. E. MILLER  3,608,374
MASS FLOWMETER

Filed March 18, 1969  6 Sheets-Sheet 4

INVENTOR.
CHARLES E. MILLER

BY Charles J. Ungemach

ATTORNEY

Sept. 28, 1971     C. E. MILLER     3,608,374
MASS FLOWMETER

Filed March 18, 1969     6 Sheets-Sheet 5

INVENTOR.
CHARLES E. MILLER
BY Charles G. Ungemach
ATTORNEY

Sept. 28, 1971     C. E. MILLER     3,608,374

MASS FLOWMETER

Filed March 18, 1969     6 Sheets-Sheet 6

INVENTOR.
CHARLES E. MILLER

BY *Charles J. Ungemach*

ATTORNEY

United States Patent Office 3,608,374
Patented Sept. 28, 1971

3,608,374
MASS FLOWMETER
Charles E. Miller, Boulder, Colo., assignor to
Honeywell Inc., Minneapolis, Minn.
Filed Mar. 18, 1969, Ser. No. 808,135
Int. Cl. G01f 1/00
U.S. Cl. 73—194B
16 Claims

ABSTRACT OF THE DISCLOSURE

A flowmeter having an impact plate means, such as a vane, which is mounted in a fluid flow and oscillated. The vane is subject to a torque produced by the drag of the flow in the vane and the mass flow rate of the fluid is inferred by measuring the torque or its effect on various parameters of the motion of the vane.

BACKGROUND OF THE INVENTION

The invention is in the general field of flow rate measurement. More specifically, the invention is a mass flow rate meter which measures the mass flow rate by inferring it from either the torque produced by the flow or its effects on various parameters describing the motion of an oscillating impact plate means in the flow.

SUMMARY

The invention is a linear momentum mass flow rate meter. The impact plate means is positioned in a flow stream generally in a plane normal to the flow and is oscillated about an axis of symmetry. The flow of fluid past the oscillating plate generates drag forces on the plate which result in drag torques on the plate opposed to and tending to damp the oscillations. The drag torques or their effects on the motion of the plate are measured in various ways and from this the mass flow rate can be inferred.

In one embodiment of the invention the amplitude of the plate, oscillating at a constant frequency, is kept constant by supplying an additional torque from a motor directly to the plate to offset the drag torque. The additional torque supplied by the motor is a function of the current to the motor. The additional torque is determined by measuring the current and it is directly related to the mass flow rate. This embodiment may be called a torque detecting-constant amplitude model.

In another embodimet, the amplitude of an oscillating vane is measured to determine the drag torque. The plate is driven with a constant torque and frequency and the mass flow is determined by measuring the resultant impact plate amplitude. This embodiment may be called an amplitude detecting-constant torque model. In a specific technique for exciting the impact plate energy is supplied to it by means of the interaction between a magnetic field and a current flowing in a winding on the plate mounted within the magnetic field. When the plate is driven at a constant frequency with a constant torque, the amplitude of oscillation decreases with an increase in mass flow rate.

In yet another embodiment a short pulse of energy is applied to the plate which drives it into oscillation. The plate then oscillates at its damped resonant frequency. The oscillation of the plate in this case is only transient and decays with time because of the drag torques produced by the mass flow. The frequency of the oscillation is directly related to mass flow rate and by measuring the frequency the mass flow rate can be inferred. This embodiment may be called a true damped resonant frequency model. The pulses of energy are applied periodically.

In another embodiment a constant or steady state torque signal (forcing signal) is applied to the impact plate means by means of a magnetic drive, for example. Changes in the mass flow rate change the system damping which causes a phase angle to exist between the driving or forcing signal and the displacement of the plate. The phase angle, which is related to the mass flow rate, is measured, thereby providing an indication of the mass flow rate.

In all cases, the fluid flow exerts a damping torque on the oscillating impact plate. The torque is measured or it affects a parameter of the oscillation of the plate in a measurable way which is related to the mass flow rate.

DESCRIPTION

Figures 1, 6:
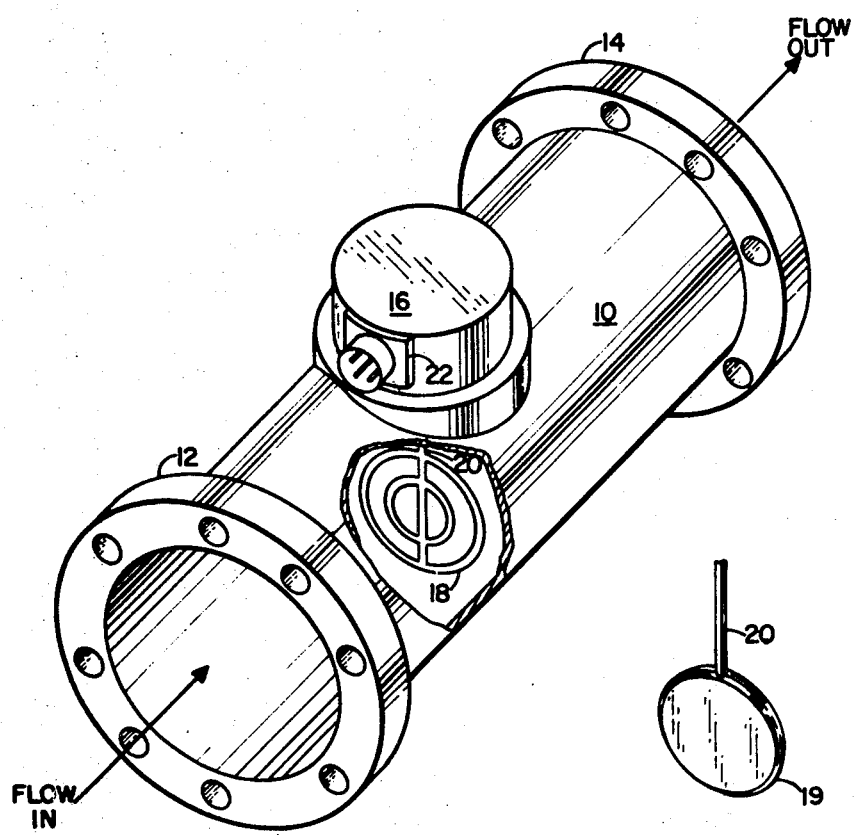
FIG. 1 is a pictorial view of a linear momentum mass flowmeter.
FIG. 6 is an impact plate in the form of a solid disk.

A simplified pictorial view of the mass flowmeter is shown in FIG. 1. The elements of the flowmeter include a section of conduit 10 in which an impact plate 18 is mounted. Plate 18 is mounted so that it can be oscillated. FIG. 6 shows a plate 19 in the form of a solid disk rather than a pair of concentric rings as shown in FIG. 1. The ends of conduit section 10 terminate in flanges 12 and 14 which eable the flowmeter to be readily inserted between sections of a conduit carrying a fluid flow. A shaft 20 couples plate 18 to a unit including a forcing generator and a torque transducer contained in a housing 16 on conduit section 10, in one embodiment of the invention. Forcing generators and torque transducers will be described in more detail at other points in this specification. An electrical plug 22 mounted on housing 16 provides means for supplying power to the flowmeter and receiving the signals developed by it.

Figure 2:
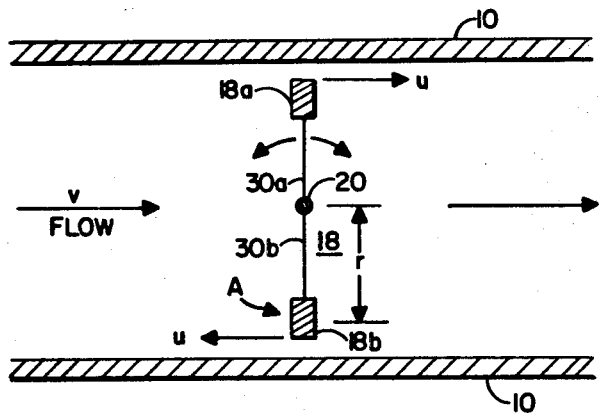
FIG. 2 is a simplified free body diagram of an impact plate positioned in the fluid flow.
Figure 4:
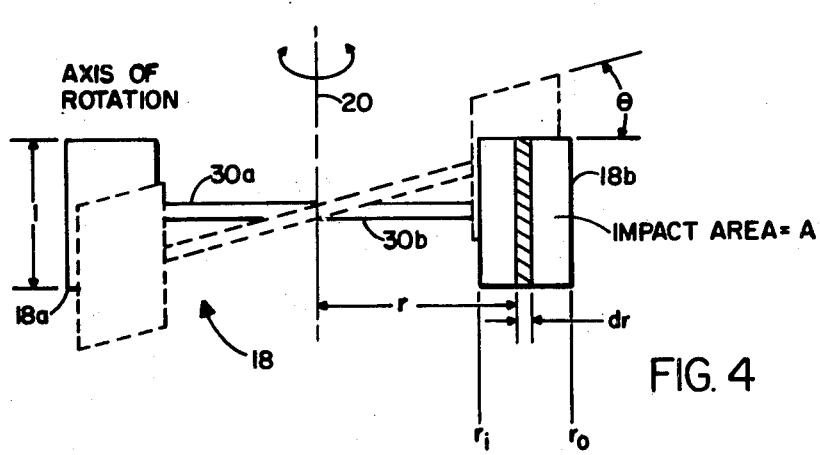
FIG. 4 is a simplified diagram of a flowmeter impact plate, useful in deriving the relationship between the fluid drag torques on the vane and the mass flow rate past the vane.

Although plate 18 is shown as a pair of concentric rings, it may take many other forms. For example, it may be a single ring, a pair of plates, or a single plate as in FIG. 6. In FIGS. 2 and 4 a pair of plates are shown for the additional reason that an analysis of the theory of operation of the flowmeter is simplified. The configuration of the impact plate can assume a variety of shapes but regardless of the form or shape of the impact plate chosen, it must be placed substantially at right angles (orthogonal) to the direction of mass flow and it must be geometrically symmetrical with respect to its axis of rotation. In one embodiment of the flowmeter, for example, the impact plate is oscillated at constant frequency and amplitude through a small angle about its orthogonal position. The rate of mass flow is inferred by measuring the energy required to maintain the frequency and amplitude of the plate oscillations constant in a mass flow.

In FIG. 2, for purposes of illustration and analysis, impact plate means 18 is shown as being comprised of two impact plates 18a and 18b symmetrically located about the axis of coupling shaft 20. Each impact plate has an area A which remains substantially at right angles to the direction of flow. Impact plates 18a and 18b are attached to shaft 20 by radial arms 30a and 30b, respectively. Radial arms 30a and 30b each have an effective length r. The impact plates 18a and 18b are oscillated through a plane which is at right angles to the direction of flow. The oscillation is assumed to be relatively small so that the area A presented to the flow is substantially constant. Obviously if the oscillation is substantial the area A would vary strongly with the cosine of the angular displacement from the orthogonal plane.

A relationship can be formulated between the mass flow rate and the torque it develops and applies to shaft 20. In FIG. 2, vane 18, comprised of plates 18a and 18b, has an instantaneous position which is shown as being orthogonal to the mass flow. The velocity of the plates at this position is given as $u$. Plate 18a has a velocity $u$ in a direction to the right, whereas plate 18b has a velocity $u$ in a direction to the left. In other words, the instantaneous oscillatory motion of impact plate means 18 is assumed to be clockwise and it has a velocity $u$ as it passes through a plane orthogonal to the mass flow. The mass flow is to the right and has a velocity $v$. It is apparent therefore that the movement of lower plate 18b is being impeded by the flow whereas that of the upper plate, 18a, is being aided. Assuming that the flow is incompressible, the force acting on the lower plate, 18b, is $$F_1 = PA \quad (1)$$

where P is the pressure exerted by the mass flow on plate 18b and A equals the area of the plate. The pressure P is equal to $$P = \tfrac{1}{2}\rho V^2 = \tfrac{1}{2}\rho(v+u)^2 \quad (2)$$

where V is the velocity of plate 18b relative to the mass flow and is equal to $(v+u)$ and is the density of the flow. By substituting Equation 2 for the pressure in Equation 1, the force $F_1$ is:

$$F_1 = \tfrac{1}{2}\rho A(v+u)^2 \quad (3)$$

In the same way it can be shown that the force acting on the upper plate, 18a, is:

$$F_2 = \tfrac{1}{2}\rho A(v-u)^2 \quad (4)$$

The torque T required to be applied to coupling shaft 20 to offset the drag forces developed on the impact plates 18a and 18b by the mass flow and maintain the oscillations at a constant amplitude and frequency is:

$$T = -r(F_1 - F_2) \quad (5)$$

where T is torque and $r$ is the moment arm associated with $F_1$ and $F_2$. By convention, torque associated with counterclockwise rotation is designated negative. After substituting for the forces $F_1$ and $F_2$ and collecting terms, this equation reduces to $$T = -(2ru)\rho v A = -(ru)\frac{dm}{dt} \quad (6)$$

where $dm/dt$ is the mass rate and is equal to $\rho vA$. The last equation shows that the torque T required to move vane 18 at a constant velocity $u$ is directly proportional to the mass flow rate $dm/dt$. The foregoing explanation of the operating principle of the flowmeter is a simplified one and should not be regarded as rigorous. A more rigorous formulation will be made in conjunction with FIG. 4.

Figure 3:
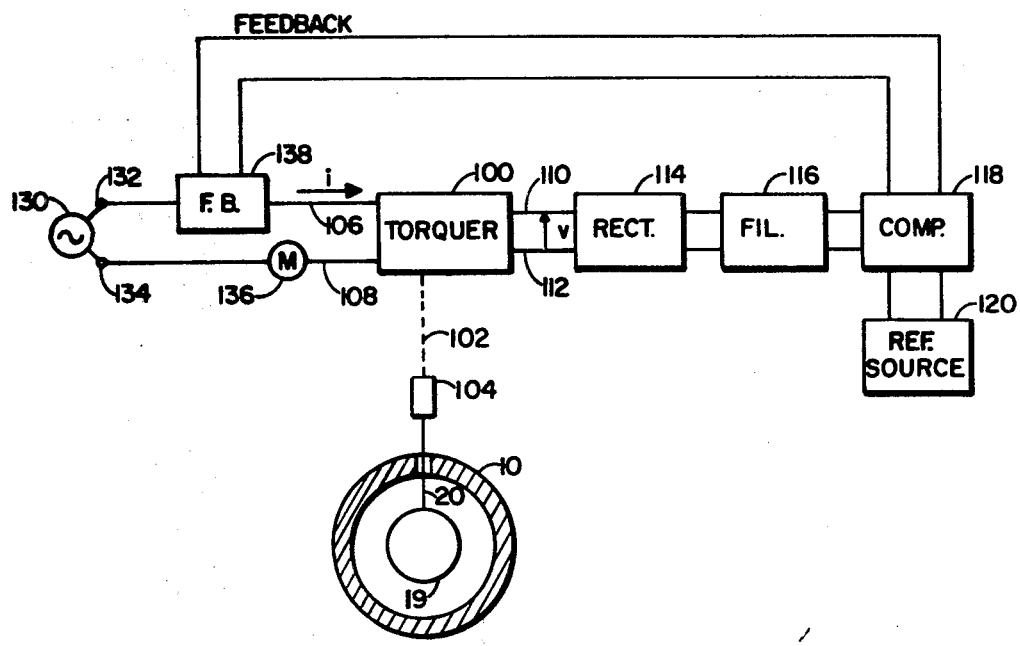
FIG. 3 is a block diagram of a first embodiment of the flowmeter.

In accordance with Equation 6 the required torque is provided by a torque transducer and forcing generator means which is contained in the apparatus of FIG. 3. FIG. 3 illustrates a first embodiment of the flowmeter, called the torque detecting-constant amplitude embodiment. A synchronous torque motor (torquer) 100 with an output shaft 102 supplies to impact plate 18 the torque required to keep it oscillating at a predetermined frequency and amplitude. Shaft 102 is connected to shaft 20 by a coupling 104. Torquer 100 is not continuously rotatable, but oscillates only through a relatively small angle. Torquer 100 has input leads 106 and 108 and output leads 110 and 112. The torque developed at shaft 102 of torquer 100 is a function of the A-C current flowing in the input leads 106 and 108. Torquer 100 also developes an A-C voltage across output leads 110 and 112 which is directly proportional to the angular position of shaft 102. Motor 100 is synchronous in that it oscillates in synchronism with the A-C input current. An example of a torquer having these characteristics is described in a U.S. Pat. 2,488,734, issued Nov. 22, 1949. Torquers are used in many devices, e.g., gyros, and are often referred to as microsyns. The A-C output voltage developed across leads 110 and 112 is processed by a full wave rectifier 114 and a filter 116. This results in a D-C voltage at the output of filter 116 which is proportional to the A-C voltage across leads 110 and 112. This D-C voltage is applied to a comparator 118 which compares the D-C voltage developed at the output of filter 116 with a fixed D-C reference voltage developed by a reference source 120. Comparator 118 may, for example, be an algebraic summing circuit, developing a D-C voltage which corresponds to the difference between the D-C voltage at the output of filter 116 and the fixed D-C voltage of reference source 120.

A source of A-C voltage 130 having output terminals 132 and 134 supplies, through input leads 106 and 108, the driving current for torquer 100. A meter 136 is connected in series with lead 108 and terminal 134 and a feedback control element 138 of variable impedance is connected between input lead 106 of torquer 100 and terminal 132 of source 130. Control element 138 is also connected to the output of comparator 118 and the impedance of element 138 is a function of the difference voltage developed by comparator 118. Impedance control elements such as element 138 are well known to persons skilled in the design of servomechanisms of which this embodiment of the flowmeter is an example.

In operation, the system is designed such that the shaft 102 of torquer 100 oscillates a predetermined number of degrees about a reference position. For example, it may oscillate 2 degrees about the reference position. The A-C voltage developed by torquer 100 and appearing across leads 110 and 112 is directly proportional to the angular position of shaft 102. The D-C voltage of the reference source 120 is selected such that the output of comparator 118 is zero voltage (or some other predetermined reference value) when torquer 100 is oscillating with the proper angular displacement, i.e. ±2 degrees. When the difference voltage developed by comparator 118 is zero, for example, the impedance control element 138 has a predetermined impedance. This allows a predetermined amount of current to flow through the input leads 106 and 108 of motor 100. The current also actuates meter 136 which is calibrated to read in terms of mass flow rate. The meter actually moves in accordance with the torque developed by torquer 100, but as shown by Equation 6, torque is directly proportional to mass flow rate. If the mass flow rate increases (decreases), the amplitude of oscillations of shaft 102 of torquer 100 momentarily decreases (increases) causing a smaller (larger) A-C voltage to be developed across leads 110 and 112. Consequently, a difference voltage is developed by comparator 118 which causes the impedance of control element 138 to change until the system is again balanced, i.e., the output of comparator 118 is zero volts. The increased (decreased) current flowing in leads 106 and 108 of torquer 100 is measured and indicated by meter 136 and consequently the increase (decrease) in mass flow rate is determined.

Figure 7:
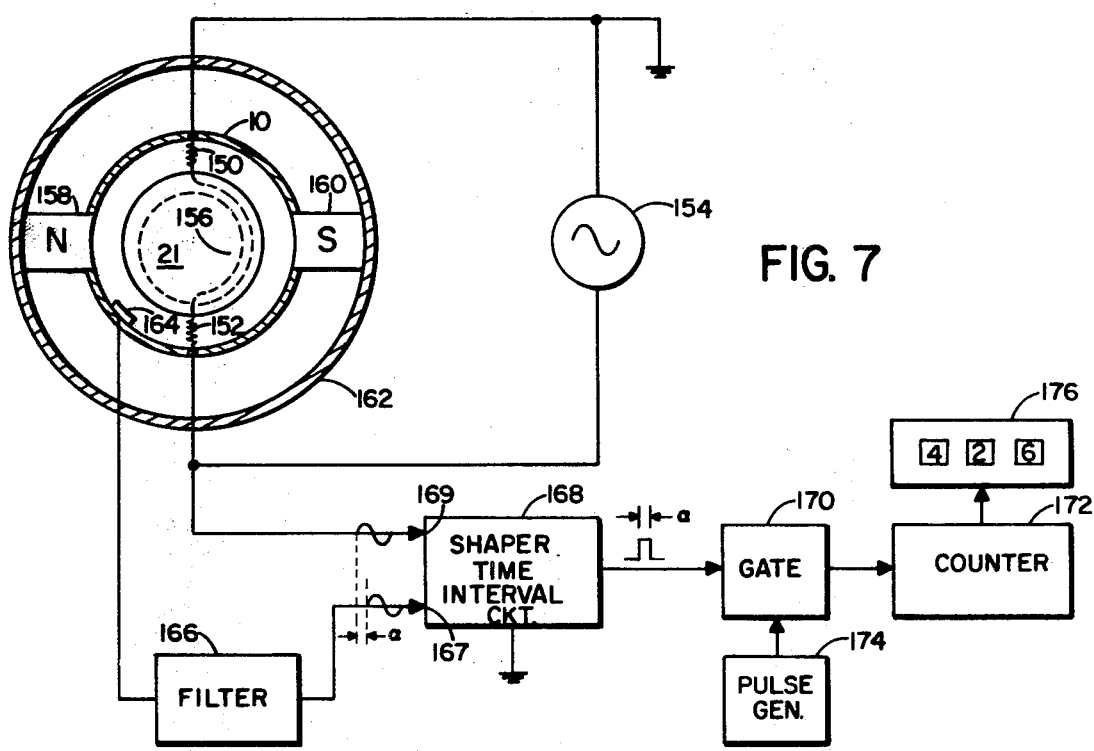
FIG. 7 is a block diagram of a second embodiment of the flowmeter.

FIG. 7 illustrates another embodiment of the flowmeter, called the phase angle embodiment. A constant alternating torque is applied to plate 21 by means of a magnetic drive which can be similar to a d'Arsonval type movement. Plate 21 is mounted within conduit 10 by pivot flexures 150 and 152. Plate 21 oscillates about the axes of the pivot flexures and they provide forces which tend to oppose angular displacement of plate 21. Whereas the shaft 20 of the embodiment of FIG. 3 provides a rigid coupling, the flexures 150 and 152 of FIG. 7 provide a flexible coupling. An A-C source 154 acts as a forcing function generator and supplies current to a coil 156 wound as an integral part of plate 21 and shown as a dashed line. Pivot flexures 150 and 152 have another function in that they provide a path for the current which flows in coil 156. Plate 21 and, hence, coil 156 are mounted within a magnetic field which exists between a pair of magnetic pole pieces 158 and 160 mounted in the conduit 10. A metal ring 162 provides support for the pole pieces and provides a return magnetic path for the flux leaving pole piece 158, designated the north pole, and entering pole piece 160, designated the south pole. An alternating torque is applied to plate 21 as a result of the interaction between the alternating current in coil 156 and the constant magnetic field associated with pole pieces 158 and 160.

A position transducer or sensor 164 is mounted on the inside of conduit 10 adjacent to plate 21. It is responsive to the position of plate 21 and develops an electrical signal which corresponds to the position of the plate. Transducer 164, for example, may take the form of an E-transformer type pickoff. Transducer 164 instead of being mounted on the conduit may also be incorporated into the structure which supports plate 21. Some of the embodiments yet to be described will clarify this. In the absence of any mass flow in conduit 10, plate 21 oscillates symmetrically about a position in a plane perpendicular to the longitudinal axis of conduit 10 which of course is the direction which mass flow takes when it occurs. The mass flow in conduit 10 causes a phase angle to occur between the positional signal developed by transducer 164 and the alternating curent supplied by source 154. It can be shown that the tangent of this phase angle $\alpha$ is a function of mass flow rate in accordance with the equation $$\tan \alpha = \frac{\beta P r^2 \dot{m}}{g(1-\beta^2)\sqrt{kI}} \qquad (7)$$

where $\beta$ is the ratio of the forcing frequency $\omega_f$ and the natural frequency $\omega_n$ of plate 21, P is a calibration constant, r is the effective radius of vane 18, $\dot{m}$ is the mass flow rate, g is the acceleration due to gravity, k is a spring constant, and I is the amount of inertia of plate 21 and its supporting structure. The system is designed such that the angle $\alpha$ is kept relatively small and therefore tan $\alpha \approx \alpha$. Equation 7 governs the operation of the flowmeter illustrated in FIG. 7 and it is sufficiently linear when the phase angle $\alpha$ is held to five degrees or less. The condition of $\alpha \leq 5°$ is only necessary if the flowmeter is to be relatively linear. Of course if linearity is not necessary a design with $\alpha > 5$ degrees can be used.

The electrical signal corresponding to the position of plate 21 and developed by position transducer 164 is processed by a filter 166. Filter 166 may be a low pass filter and removes transients which occur when the flowmeter is initially energized and when abrupt changes in the mass flow rate occur. The filtered signal is applied to a first input 167 of a shaper and time interval circuit 168. A signal corresponding to the signal developed by the forcing function generator 154 is applied to a second input 169 of circuit 168. Circuit 168 develops a pulse at its output which has a length equal to the difference in phase between the signal applied to input 169 and the signal applied to input 167. Circuit 168 contains shapers which square up the sinusoidal signals present at the inputs 167 and 169. The shapers, for example, can be high gain amplifiers in combination with clippers. After shaping, the two signals are applied to a time interval portion of circuit 168. For example, the time interval portion of circuit 168 can comprise an inverter and an AND circuit. One of the shaped input signals is applied directly to one input of the AND circuit and the other shaped input signal is applied to the inverter, the output of which is applied to the second input of the AND circuit. The output of the AND circuit is a pulse having a time length equal to the phase difference between the two input signals.

The output signal developed by circuit 168 is applied to a gate means 170 which is associated with a counter 172. Pulses developed by a pulse generator 174 are accumulated (counted) by counter 172 when gate 170 is actuated (enabled) by the output signal of circuit 168. Therefore a count in counter 172 is developed which is proportional to the time length of the output signal of circuit 168. The count in counter 172 is proportional to the phase angle $\alpha$ and therefore is also proportional to the mass flow rate $\dot{m}$ in conduit 10 in accordance with Equation 7. The count developed in counter 172 can be shown in a display unit 176 which, of course, is calibrated in terms of mass flow rate rather than phase angle.

The springs associated with pivot flexures 150 and 152 should be linear. Non-linear springs will degrade the performance of the flowmeter. Springs which are substantially linear throughout the operating range of the flowmeter but which become non-linear when the upper limit of the operating range is reached, can be used for overload protection.

Figure 8:
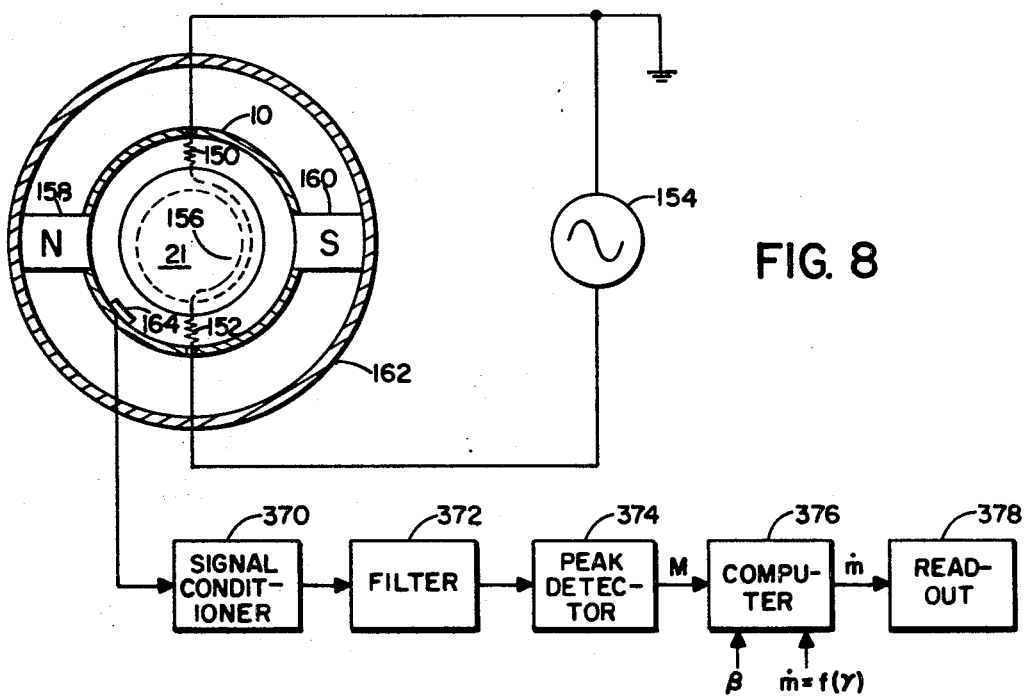
FIG. 8 is a block diagram of a third embodiment of the flowmeter.

FIG. 8 shows a third embodiment of the flowmeter, called an amplitude detection-constant torque embodiment. This embodiment is related to the phase angle embodiment of FIG. 7 in that the flowmeter per se has the same mechanical structure and is energized in the same way. However, instead of measuring phase angle $\alpha$ the maximum displacement of the impact plate is measured or sensed and from this the mass flow rate $\dot{m}$ can be determined. This embodiment, like that of FIG. 7, incorporates non-rigid coupling (pivot flexures) and therefore changes in the damping of the system causes corresponding changes in the amplitude (maximum displacement).

The signal from transducer 164 is processed by a signal conditioner 370 and a filter 372 after which its peak amplitude is determined by a peak detector 374. Detector 374 develops a signal which is indicative of amplitude M where M is related to the angular displacement $\theta$ of impact plate 18 by the following equation:

$$\theta = \theta_{ST} M \cos(\omega_f t - \alpha) \qquad (8)$$

where $\theta_{ST}$ is a constant, $\omega_f$ is the frequency of generator 154, t is time, and $\alpha$ is the phase angle of impact plate 18 with respect to the forcing generator signal. Amplitude M, also called the magnification factor, is related to the damping ratio $\gamma$ of the flowmeter as follows:

$$M = [(1-\beta^2) + (2\beta\gamma)^2]^{-\frac{1}{2}} \qquad (9)$$

where $\beta$ is the ratio of $\omega_f$ to the natural frequency $\omega_N$ of the flowmeter. The natural frequency $\omega_N$ and $\omega_f$, of course, are predetermined so that $\gamma$ is a known predetermined parameter. The last equation shows that the amplitude of the magnification factor M is a function of the damping $\gamma$ and is therefore also a function of the mass flow rate $\dot{m}$. It can be shown that $\gamma$ and $\dot{m}$ are related as follows:

$$\gamma = \frac{P r^2 \dot{m}}{2g\sqrt{kI}} \qquad (10)$$

As the mass flow rate $\dot{m}$ decreases (increases), the damping ratio $\gamma$ decreases (increases), the energy dissipated or lost by the system decreasee (increases), and the amplitude of the system oscillations increases (decreases). The signal indicative of amplitude M developed by detector 374, and the parameter $\beta$ are fed to a computer 376, for example, a digital computer, which in effect solves the Equation 9 for damping ratio $\gamma$. With a solution for $\gamma$, the mass flow rate $\dot{m}$ is readily computed from Equation 10. The output of computer 376, indicative of mass flow rate $\dot{m}$ is presented on a readout device 378.

The relation between mass flow rate $\dot{m}$ and amplitude M is non-linear and dependent on $\beta$ and $\gamma$. Therefore $\beta$ and the maximum value of the damping ratio $\gamma$ must be adjusted by proper design such that the required sensitivity is obtained over the flow range selected. A damping ratio $\gamma$ between 0.5 and 1.0 will result in a reasonable sensitivity.

Figure 9:
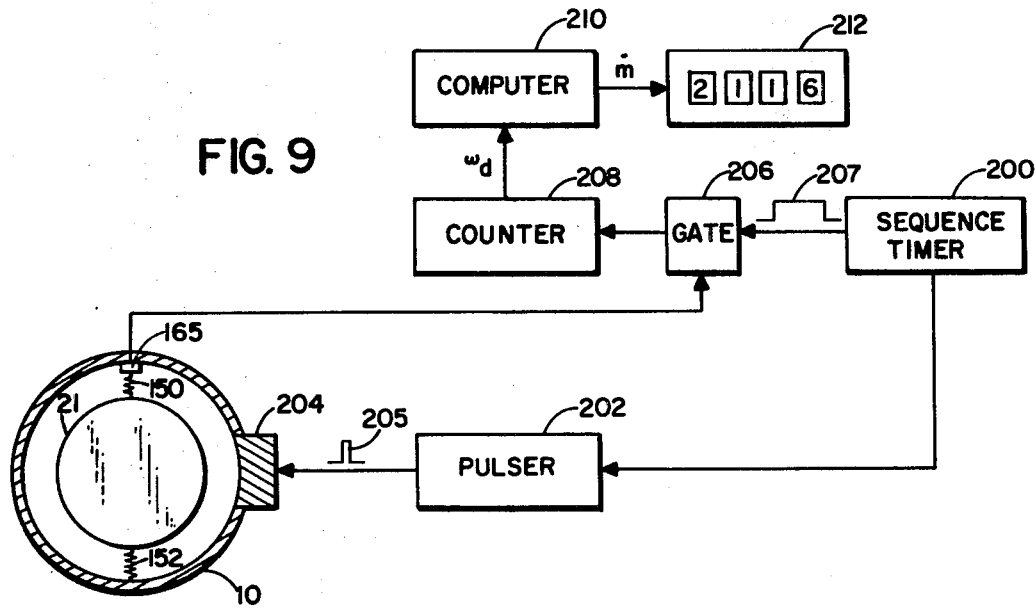
FIG. 9 is a block diagram of a fourth embodiment of the flowmeter.

FIG. 9 illustrates a fourth embodiment of the flowmeter, called the damped frequency embodiment. This flowmeter utilizes the dependence between the damping and the resonant frequency as a measure of mass flow rate. Plate 21 is one component of a damped vibration system. The change in resonance of any damped vibration system can manifest itself in two distinct ways. For example, when a damped spring-mass system e.g., plate 21 and its supporting structure, is momentarily perturbed an oscillatory motion results having a frequency which is a damped resonant frequency $\omega_d$. It can be shown that the frequency of this damped motion is related to the mass flow rate in conduit 10 as follows:

$$\omega_d^2 = -\frac{1}{4}(\dot{m})^2 \left[\frac{\omega_N P r^2}{g\sqrt{kI}}\right]^2 + \omega_N^2 \quad (11)$$

In FIG. 9 a sequencing timer 200 periodically triggers a pulse circuit 202. The output of pulser 202 energizes a small electromagnet 204 mounted in the wall of conduit 10 adjacent to plate 21. Thus electromagnet 204 periodically receives a pulse of energy 205. Magnet 204 is purposely misaligned with the plane of plate 21. Plate 21 includes a D.C. coil, etc., (not shown). When magnet 204 is energized it creates a momentary torque on plate 21 which causes it to resonate. Position transducer 165, mounted on the support means associated with plate 21, senses the position of plate 21 during its resonant mode and develops an electrical signal which is proportional to the position of plate 21. The signal developed by transducer 165 represents the damped resonant frequency $\omega_d$ of plate 21. When timer 200 triggers pulser 202, it simultaneously develops a square pulse 207 having a predetermined time duration. This pulse is used to enable a gate 206 which is associated with a counter 208. When gate 206 is enabled cycles of the signal developed by transducer 165 are counted in counter 208. That is, each cycle of the signal developed by transducer 164 is transmitted through gate 206 and counted in counter 208 during the time gate 206 is enabled. The count in counter 208, representing the resonant frequency $\omega_d$ of plate 21, is received by a digital computer 210. Computer 210 solves Equation 11 for $\dot{m}$ and a digital signal corresponding to the mass flow rate $\dot{m}$ is displayed in a unit 212.

The change in resonance of any damped vibration system can manifest itself in a second way and this may form the basis of another embodiment of the flowmeter called the forced damped resonant frequency ($\omega_{fd}$) embodiment. As the forcing frequency of a damped system is increased from a point less than its resonant frequency, the amplitude of the motion (oscillation) increases until a maximum is reached. A further increase in the forcing frequency causes the amplitude to decrease. The frequency at which maximum amplitude occurs can be considered a forced damped fresuency, $\omega_{fd}$. This frequency is a function of the amount of damping present; the damping, of course, is an indication of mass flow rate $\dot{m}$. The forced damped frequency is related to the mass flow rate by the following equation:

$$\omega_{fd}^2 = -\frac{1}{2}(\dot{m})^2 \left[\frac{\omega_N P r^2}{g\sqrt{kI}}\right]^2 + \omega_N^2 \quad (12)$$

This equation is valid for $$\gamma \leq \frac{1}{\sqrt{2}}$$

Note that the Equations 12 and 11 are identical except for a constant in the first term on the right-hand side.

Figure 10:
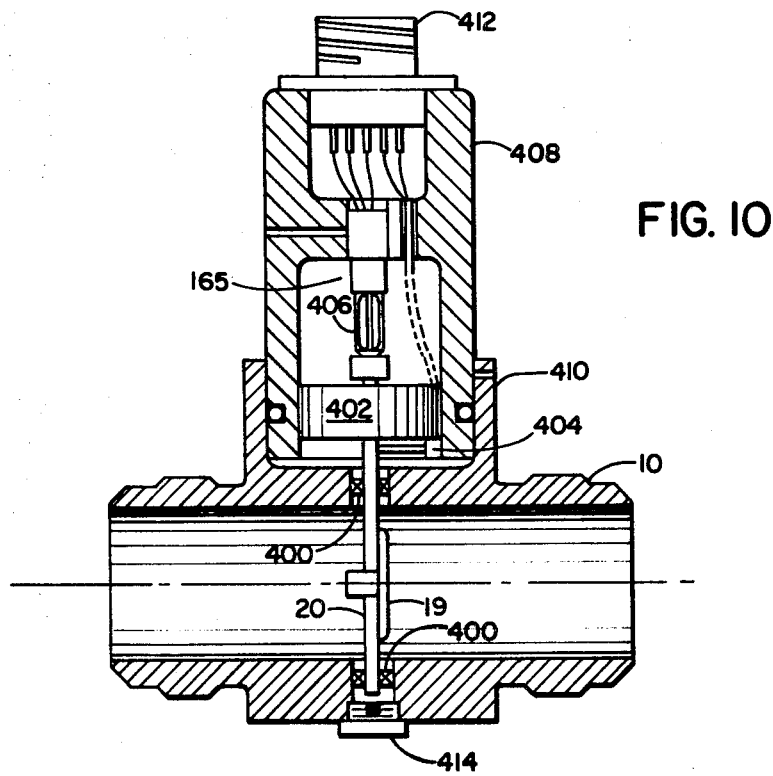
FIG. 10 is an assembly drawing showing a versatile mechanical design for a flowmeter.

FIG. 10 shows a mechanical design for a flowmeter. The operational distinctions between various embodiments are clarified by using the same mechanical design in each case. It becomes obvious that the various embodiments can then be defined simply on the basis of particular signal condition.

In FIG. 10 impact plate 19 is attached (spot welded) to shaft 20 which is supported by a set of bearings 400. Both bearings are located in conduit 10 (also called the housing); one bearing is associated with the bottom portion of shaft 20, the other with the top portion. The flowmeter may also be designed without the bottom bearing. The upper end of shaft 20 is connected to the rotor of a torque motor 402. If desired shaft 20 may be made integral with the rotor. The angular displacement of shaft 20 is restricted by a limit stop mechanism 404. The rotor of motor 402 is also connected to a position transducer 165 by a quadrilever (torsion spring) 406. The quadrilever may also function as an element of the position transducer. Motor 402 and transducer 165 are mounted in a cap 408 which fits into a cup 410 on conduit 10. Leads associated with motor 402 and transducer 165 are attached to a connector 412 which fits on top of cap 408. A plug 414 seals off the bore in conduit 10 associated with the lower end of shaft 20.

The various embodiments described up to this point can be implemented with the mechanical design shown in FIG. 10. The various embodiments can be distinguished by the electriacl signal condition. Thus the electrical signal developed by transducer 165 and corresponding to the position of impact plate 19 can be used in a number of ways. That is, the amplitude, phase, or frequency of the position signal can be controlled, or measured to infer or determine the mass flow rate $\dot{m}$. In the first embodiment of FIG. 3 the amplitude is compared with a reference quantity and torque is supplied to keep the amplitude constant. In other words the amplitude is controlled. The torque so supplied is a measure of damping from which $\dot{m}$ can be inferred. In the second embodiment of FIG. 7 a constant (steady state) torque is applied and the phase angle of the position signal, with respect to the torque signal, is measured. The phase angle is a function of damping from which the mass flow rate can be inferred. In the embodiment of FIG. 8 the frequency and torque are maintained in a steady state and the amplitude of the position signal is measured. The amplitude is a function of damping from which the mass flow rate can be inferred. In the embodiment of FIG. 9 a momentary periodic torque is applied to the impact plate, oscillating it. The oscillations of the impact plate are damped and from the frequency of the damped oscillations the mass flow rate can be inferred.

In another embodiment a variable forcing frequency signal is applied to the damped system, which includes the impact plate, until the amplitude of the oscillations reaches a maximum. The frequency at which maximum amplitude occurs may be considered to be a forced damped resonant frequency ($\omega_{fd}$). The frequency $\omega_{fd}$ depends upon the amount of damping present and is related to the mass flow rate. The mass flow rate can be computed if $\omega_{fd}$ is known. This embodiment may be called a forced free resonant frequency model.

In all instances, then, a torque motor means, an impact plate and a position transducer are necessary to form a flowmeter and the mechanical design of FIG. 10 meets that requirement.

Figure 11:
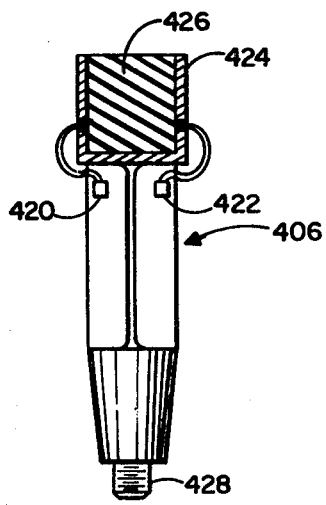
FIG. 11 shows a strain gage position transducer for use in a flowmeter.

FIG. 11 is a diagram of a sensing element or position transducer. The transducer comprises a quadrilever 406 upon two leaves of which strain gages 420 and 422 are mounted. Either wire (e.g., a small foil type wire gage) or semiconductor strain gages can be used. A cup 424 on the top of quadrilever 406 is filled with a potting compound 426 such as silicon rubber. Although the strain gages are shown mounted on opposing or different quadrilever leaves, they could be mounted on opposite sides of the same leaf to minimize transient temperature effects. The lower end of quadrilever 406 forms a threaded bolt 428 by which it can be connected to the rotor of a torque motor.

Figure 12:
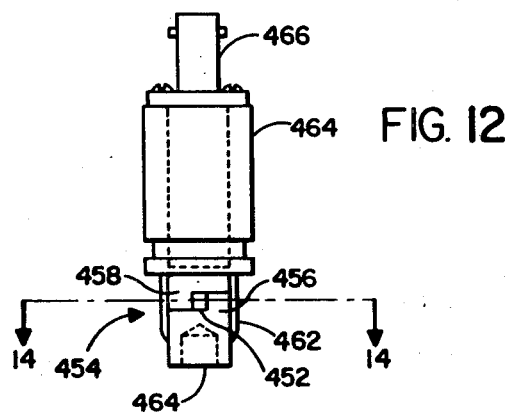
FIGS. 12 and 13 show a piezoelectric position transducer for use in a flowmeter.
Figure 13:
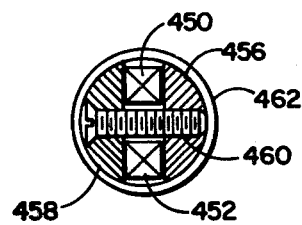

FIGS. 12 and 13 show a piezoelectric position transducer which can be used in the flowmeter. The transducer comprises two piezoelectric crystals 450 and 452 mounted in a housing 454 which serves as a force summing member. Lead zirconate titanate crystals can be used. Housing 454 comprises two members 456 and 458 which form a clamp for the crystals and which are held together, in compression, by a tie bolt 460. Crystals 450 and 452 are mounted in housing 454 diametrically opposing each other. A torque acting about housing 454 results in a compression of one crystal and an expansion of the other. By connecting the crystal electrodes (not shown) in series an output voltage is generated whenever a torque is applied and housing 454 twists. The crystals are isolated from the flow material by a sleeve 462 (e.g., of rubber) placed around the transducer housing 454. The lower end of member 456 has a bore 464 into which a rotor shaft can be force fitted. The top of member 458 forms a cup 464 which is capped with a coax connector 466.

The apparatus of FIGS. 12 and 13 may also be used as a torque transducer if highly stable ceramic crystals, e.g., lead metaniobate are used.

The fundamental principle of the flowmeter is based on the fact that drag forces, resulting from fluid flow, are generated on the impact plate areas. For proper flowmeter performance it is necessary that the drag forces obey the square resistance law:

$$F_D = C_D \rho A v^2 \quad (13)$$

where $C_D$ is the drag coefficient, $\rho$ is the fluid density, $A$ is the impact area, and $v$ is the flow velocity. FIG. 4 shows one arrangement of the impact plate means 18. The flow is assumed to be normal to the plane of the paper. From Equation 13 the element of force $dF_1$ acting on element $dr$ of the impact plate 18b, moving clockwise, is:

$$dF_1 = C_D \rho l \left[ v - \frac{d}{dt}(r \sin \theta) \right]^2 dr \cos \theta \quad (14)$$

where $v$ is the velocity of the fluid and $\theta$ is the angle between plate means 18 and a plane at right angles to the flow. Expanding Equation 14 gives:

$$dF_1 = C_D \rho l [v^2 + 2r\dot\theta v \cos \theta + r^2 \dot\theta^2 \cos^2 \theta] \cos \theta \, dr \quad (15)$$

In a similar manner the force acting on impact plate 18a is:

$$dF_2 = C_D \rho l [v^2 - 2r\dot\theta v \cos \theta + r^2 \dot\theta^2 \cos^2 \theta] \cos \theta \, dr \quad (16)$$

The element of torque acting about the axis of rotation (shaft 20) is:

$$dT = r(dF_1 - dF_2) = 2 C_D \dot\theta \rho v l \cos^2 \theta \, r^2 dr \quad (17)$$

Therefore the total torque is found to be:

$$T = 2\dot\theta \rho v C_D \cos^2 \theta l \int_{r_i}^{r_o} r^2 dr \quad (18)$$

Integrating gives:

$$T = 2\dot\theta \rho v C_D \cos^2 \theta l \frac{r_o^3 - r_i^3}{3} \quad (19)$$

but the mass flow rate is:

$$\frac{dm}{dt} = \dot m = \rho v A = \rho v 2l (r_o - r_i) \quad (20)$$

and therefore $$T = C_D \left[ \frac{r_o^3 - r_i^3}{3(r_o - r_i)} \right] \cos^2 \theta \, \dot m \dot\theta \quad (21)$$

The torque $T$ depends on the mass flow rate $\dot m$ and the angular velocity $\dot\theta$ of the plates 18a and 18b. The $\cos^2 \theta$ term indicates that the torque has a positional dependence. To minimize this dependence $\theta$ can be restricted to angles equal to or less than 5 degrees so that $\cos^2 \theta \approx 1$. The torque on the impact plates then becomes:

$$T = P \dot\theta \dot m \quad (22)$$

where P is a calibration constant.

Equation 22 shows that the torque on plates 18a and 18b is proportional to the mass flow rate. To arrive at the mass flow rate through the entire cross section of the conduit $\dot m$ must be multiplied by a factor which is the ratio of the conduit area and the area of plates 18a, 18b. This factor can be included in the calibration constant P.

Figure 5:
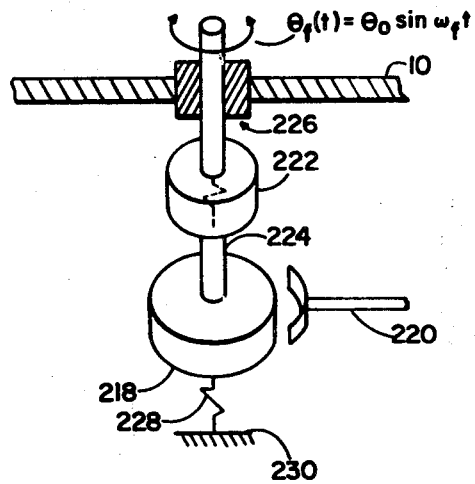
FIG. 5 is a diagram of the dynamic equivalent system of the mass flowmeter.

The dynamic equivalent system of the linear momentum mass flowmeter is shown in FIG. 5. The impact plates 18a, b are represented by a disk 218 having an inertia I. A viscous damping force, given by equation 22, and is represented by a brake 220 adjacent disk 218. An oscillatory motion of the form $\theta_f(t) = \theta_0 \sin \omega_f t$ is imparted to the system by a forcing generator (not shown). The motion is transmitted through a torque transducer 222 having a stiffness $k'$ and an elastic shaft 224 of stiffness $k$ to the disk 218. Associated with a bearing type support 226 is a retarding torque of magnitude $T_c$. A support flexure 228 with a stiffness $k''$ is shown connected between disk 218 and a fixed point 230. Some designs eliminate support flexure 228. If the flowmeter does not include a support flexure 228, $k''=0$. The respective torques associated with the system of FIG. 5 are:

(a) Inertia
$$T_I = I\ddot\theta$$

(b) Damping
$$T_D = \cos^2 \theta \dot\theta \dot m$$

(c) Spring
$$T_S = (k' + k)\theta$$

Summing torques and equating to the input torque $$T_I + T_D + T_S + T_c = K_1 \theta_0 \sin \omega_f t \quad (23)$$

and by substitution $$I\ddot\theta + [Pr^2 \cos \theta \, m]\dot\theta + (k' + k)\theta + T_c = K_1 \theta_0 \sin \omega_f t \quad (24)$$

This is the complete equation of motion of the system. This equation is non-linear due to the term which includes $\cos^2 \theta$ and cannot readily be solved. However it can be readily solved if $\theta$ is restricted to angles equal to or less than 5 degrees. Obviously for an accurate flowmeter the inertia, spring, and bearing torques should either be small or offset each other. The various embodiments of the flowmeter are based on Equation 23 and its solutions.

These flowmeters present a minimum of moving parts to the flow stream and have mechanical and electrical simplicity. For incompressible flow, the rotational or oscillatory displacement of the impact plate means needn't be very large. For example, several degrees is sufficient. In fact the angular displacement must be kept relatively small or the torque will not vary linearly with mass flow rate, but instead will depend on the cosine of the angular position of the plate with respect to its orthogonal position. There is virtually no limit to how small the impact plate displacement can be. For example, even displacements of less than 0.1 degree are acceptable. The oscillatory motion of the impact plate can be generated by a number of different electromechanical or mechanical devices only some of which have been shown and high reliability is not difficult to achieve. Some of the drive systems have been characterized as electromechanical or magnetic; other systems can be used.

In the explanation accompanying FIG. 2 it was shown that the sensitivity of the flowmeter depends upon the radii $r$, the velocity $u$, of the vane, and the impact area A. It can be shown that the impact area of the impact plate means need only be a small fraction of the cross sectional area of conduit section 10. A ratio of about ½ has been found to work well. Impact plates 18a and 18b may be streamlined to provide a flowmeter with a relatively low pressure drop. The impact plate configurations shown in the various figures are only several of many possible designs.

Because the flowmeter is inherently simple, it can be readily adapted to a large number of flow measurement applications. The sensitivity of the flowmeter depends only on the physical parameters associated with it and not with the parameters of the fluid being measured; therefore, the flowmeter can be considered for many types of fluid, including: liquified natural gas, oil, gasoline and jet fuel, and cryogens, including slush hydrogen.

The particular flowmeter embodiments shown and described herein are not claimed to be exhaustive. Many modifications and changes can be made to the embodiments as shown and other embodiments may be developed without departing from the spirit and scope of the present invention is to be limited only by the following claims.

I claim:

1. A flowmeter comprising:
   impact plate means with an axis of rotation and a surface area which is symmetrical about the axis;
   means for mounting the impact plate means in a fluid stream with the surface area generally perpendicular to the stream, which impacts on the surface area, the mounting means allowing the impact plate means to be oscillated about its axis of rotation, drag forces and torques being exerted on the impact plate means as a result of its interaction with the fluid stream;
   means for producing oscillation of the impact plate means; and,
   means for providing an output signal indicative of the drag torque which in turn is a measure of the mass flow rate of the fluid stream.

2. The apparatus of claim 1 wherein the means for providing an output signal includes means for developing a torque which is substantially equal and opposite to the drag torque and which is applied to the impact plate means to offset the drag torque so that the amplitude of the impact plate means oscillations is maintained constant.

3. The apparatus of claim 2 wherein the means for producing oscillation of the impact plate means and the means for providing an output signal, comprises:
   a motor, the shaft of which is connected to the impact plate means, the motor generating an alternating current signal which is proportional to the position of its shaft;
   a source of alternating current for application to the motor, causing it to oscillate in synchronism with the current and develop a torque at its shaft which is proportional to the input current;
   means for rectifying and filtering the alternating current generated by the motor, thereby developing a direct current which is proportional to the amplitude of the oscillations of the motor shaft;
   a source of fixed direct current which is proportional to a predetermined fixed amplitude of the oscillations of the motor shaft;
   means for comparing the two aforementioned direct currents and developing a difference current;
   means connected between the source of alternating current and the motor and responsive to the difference current to vary the current to the motor so as to minimize the difference current; and
   a meter which is actuated by the alternating current applied to the motor.

4. The apparatus of claim 1 wherein:
   the mounting means is resilient; and,
   the means for providing an output signal includes means for developing a signal which is indicative of the effect the drag torques have on a parameter of the oscillation of the impact plate means, the parameter being functionally related to the mass flow rate of the fluid stream and the measure of the parameter being a measure of the flow rate.

5. The apparatus of claim 4 wherein the parameter is the phase angle between an angular quantity associated with the means for producing oscillation of the impact plate means and an angular quantity associated with the output signal.

6. The flowmeter of claim 4 wherein:
   the means for producing oscillation of the impact plate means, comprises;
   a conductive coil associated with the impact plate means,
   means for producing a magnetic field within which the impact plate means and its associated coil is mounted, and, means for supplying an alternating current to the coil via the resilient mounting means, and,
   the means for measuring the effect on the oscillations of the impact plate means of the drag torques, comprises;
   a pickoff means sensing the position of the impact plate means and generating a signal which is proportional to the position, and, means for measuring the phase angle between the alternating current supplied to the coil and the signal developed by the pickoff, the phase angle being a measure of the mass flow rate of the fluid stream.

7. The apparatus of claim 6 wherein the signal generated by the pickoff is filtered with frequency discrimination means to remove spurious signals caused by flowmeter start-up and transient fluid flow conditions.

8. The apparatus of claim 6 wherein the means for measuring the phase angle, comprises:
   means for shaping the signal generated by the pickoff and another signal corresponding to the alternating current supplied to the coil;
   means responsive to the two aforementioned signals for generating a third signal having a time duration corresponding to the phase angle of the first two signals;
   a source of periodic pulses; and,
   a counter, responsive to the periodic pulses durnig the time duration of the third signal.

9. The apparatus of claim 4 wherein the resilient mounting means is substantially linear within a predetermined range of the flowmeter and non-linear outside the range.

10. The apparatus of claim 4 wherein the parameter is amplitude.

11. The apparatus of claim 4 wherein:
    the means for producing oscillation of the impact plate means, comprises;
    a conductive coil associated with the impact plate means;
    means for producing a magnetic field within which the impact plate means and its associated coil is mounted; and,
    means for supplying an alternating current to the coil via the resilient mounting means, and, the means for measuring the effect of the drag torques on the oscillation of the impact plate means, comprises;
    a pickoff means sensing the position of the impact plate means and generating a signal which is proportional to the position, means for conditioning and filtering the position signal, means for detecting and generating a signal corresponding to the peak amplitude of the position signal, the peak amplitude being a measure of the mass flow rate of the stream.

12. The apparatus of claim 4 wherein the parameter is frequency.

13. The apparatus of claim 4 wherein the means for producing oscillation of the impact plate means comprises:
- an electromagnet mounted outside the plane of and adjacent to the impact plate means;
- means for periodically and momentarily energizing the electromagnet so that a magnetic field is generated which exerts a torque on the impact plate means, causing it to oscillate; and,
- the means for providing an output signal indicative of the drag torques comprises:
- an electronic gate which is energized at the same time the electromagnet is;
- means responsive to the position of the impact plate means and developing a signal in accordance with its position; and
- a frequency measuring circuit activated by the electronic gate and measuring the frequency of the position signal which is a measure of the mass flow rate of the fluid stream.

14. The flowmeter of claim 1 wherein the impact plate means comprises a flat disk with rounded edges.

15. The flowmeter of claim 14 wherein the area of the disk is about ½ the cross sectional area of the fluid stream.

16. The flowmeter of claim 1 wherein the impact plate means comprises a plurality of plates supported by a plurality of arms which radiate from a shaft, the axis of the shaft being the axis of rotation.

References Cited
UNITED STATES PATENTS

| | | | |
|---|---|---|---|
| 1,935,445 | 11/1933 | Heinz | 73—194 |
| 2,358,374 | 9/1944 | Ashcraft | 73—32 |
| 2,741,918 | 4/1956 | Boisblanc | 73—194 |
| 3,218,851 | 11/1965 | Sipin | 73—194 |
| 3,426,593 | 2/1969 | Jacobs | 73—194 |

CHARLES A. RUEHL, Primary Examiner